United States Patent
Liu et al.

(10) Patent No.: US 12,164,197 B2
(45) Date of Patent: Dec. 10, 2024

(54) BACKLIGHT SOURCE AND DISPLAY DEVICE

(71) Applicant: TCL CHINA STAR OPTOELECTRONICS TECHNOLOGY CO., LTD., Guangdong (CN)

(72) Inventors: Jing Liu, Guangdong (CN); Hongzhao Deng, Guangdong (CN); Zhengbo Cui, Guangdong (CN); Hao Chen, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/622,802

(22) PCT Filed: Dec. 17, 2021

(86) PCT No.: PCT/CN2021/139356
§ 371 (c)(1),
(2) Date: Dec. 25, 2021

(87) PCT Pub. No.: WO2023/103059
PCT Pub. Date: Jun. 15, 2023

(65) Prior Publication Data
US 2024/0027834 A1    Jan. 25, 2024

(30) Foreign Application Priority Data

Dec. 10, 2021   (CN) .......................... 202111505928.1

(51) Int. Cl.
*G02F 1/1335* (2006.01)
*G02F 1/13357* (2006.01)
*G09G 3/34* (2006.01)

(52) U.S. Cl.
CPC .. *G02F 1/133612* (2021.01); *G02F 1/133603* (2013.01); *G09G 3/3406* (2013.01); *G09G 2320/0646* (2013.01)

(58) Field of Classification Search
CPC ........ G02F 1/133612; G02F 1/133603; G09G 3/3406; G09G 2320/0646; G09G 3/3413; H01L 25/0753; H01L 33/62
(Continued)

(56) References Cited

U.S. PATENT DOCUMENTS

2012/0162836 A1   6/2012   Furuta et al.
2018/0218670 A1*  8/2018   Huska ................... H01L 25/167
2019/0229133 A1   7/2019   Li

FOREIGN PATENT DOCUMENTS

CN   101929639 A   12/2010
CN   205944093 U    2/2017
(Continued)

OTHER PUBLICATIONS

International Search Report in International application No. PCT/CN2021/139356, mailed on May 26, 2022.
(Continued)

*Primary Examiner* — Amare Mengistu
*Assistant Examiner* — Gloryvid Figueroa-Gibson
(74) *Attorney, Agent, or Firm* — PV IP PC; Wei Te Chung

(57) ABSTRACT

A backlight source and a display device are provided. The display panel includes the plurality of stacked metal sub-layers and the first passivation sub-layer and the second passivation sub-layer stacked. The first passivation sub-layer is disposed between the metal layer and the second passivation layer. Material of the first passivation sub-layer includes silicon nitride. The first passivation sub-layer covers the untidy area at the ends of the molybdenum-titanium (Continued)

alloy thin layer to avoid from detachment of the passivation layer, and meanwhile to solve the issues of simplifying the manufacturing process of the display panel, and to avoid from oxidation of the bonding pads.

17 Claims, 5 Drawing Sheets

(58) Field of Classification Search
USPC .......................................................... 345/204
See application file for complete search history.

(56) References Cited

FOREIGN PATENT DOCUMENTS

| | | | |
|---|---|---|---|
| CN | 110462849 A | 11/2019 | |
| CN | 111446283 A | 7/2020 | |
| CN | 111489704 A | 8/2020 | |
| CN | 111710312 A * | 9/2020 | ............... G09F 9/35 |
| CN | 212541764 U | 2/2021 | |
| CN | 113140589 A | 7/2021 | |
| CN | 113454703 A | 9/2021 | |
| CN | 113539136 A | 10/2021 | |
| CN | 113748453 A | 12/2021 | |
| WO | 2019240534 A1 | 12/2019 | |

OTHER PUBLICATIONS

Written Opinion of the International Search Authority in International application No. PCT/CN2021/139356, mailed on May 26, 2022.
Chinese Office Action issued in corresponding Chinese Patent Application No. 202111505928.1 dated Aug. 11, 2022, pp. 1-8.
Chinese Office Action issued in corresponding Chinese Patent Application No. 202211585355.2 dated Sep. 24, 2024, pp. 1-7.

* cited by examiner

BACKLIGHT SOURCE AND DISPLAY DEVICE

FIELD

The present disclosure relates to display technologies, and more particularly, to a backlight source and a display device.

BACKGROUND

Mini light emitting diodes (mini-LEDs), also known as "sub-micrometer light emitting diodes", refer to LEDs with a die (chip) size ranging from 50 microns to 200 microns. They apply to Mini LED displays and LCDs with Mini LED backlight panels. Because mini LED displays have excellent performance in terms of energy consumption, color gamut, contrast, etc., and the process difficulty is not as great as micro LEDs, mini LED displays are expected to become the leading product for LCD upgrades.

The existing backlight products on the market are based on technologies of two or more layers of metal wiring methods. Two-layer and more than two-layer of metal wiring methods have problems such as easy shorting between different metal layers and high cost. The channels of existing driver ICs on the market are not compatible with single-layer metal designs.

Therefore, there is an urgent need to solve the issues of easy shorting between different metal layers of the above-mentioned backlight products and high cost.

SUMMARY

In view of the above, the present disclosure provides a backlight source and a display device to solve the technical issues of easy shorting between different metal layers of prior art backlight products and high cost.

In order to achieve above-mentioned object of the present disclosure, one embodiment of the disclosure provides a backlight source, including:
- a substrate;
- a circuit layer disposed on the substrate;
- a plurality of light emitting units disposed on the circuit layer; and
- a plurality of driving chips disposed on the circuit layer, disposed between adjacent light emitting units, and configured to drive the plurality of light emitting units to emit light, wherein the circuit layer includes signal input traces, signal output traces, and a plurality of light control trace disposed at a same layer and further includes signal input pads, signal output pads, and a plurality of light control pads correspondingly, the signal input traces are connected to the signal input pads, the signal output traces are connected to the signal output pads, the light control traces are connected to the light control pads, the signal input pads, the signal output pads, and the light control pads are connected to the driving chips, the plurality of light control pads are disposed at a plurality of ends of the driving chips near the light emitting units, the signal input traces and the signal output traces are disposed between the light control pads and configured to transmit signal to the driving chips.

In one embodiment of the backlight source, the circuit layer further includes data traces and data pads connected to the data traces, the data pads are disposed between the plurality of light control pads, the data traces, the plurality of light control traces, the signal input traces, and the signal output traces are all disposed at the same layer, and one of the signal input traces and one of the signal output traces are disposed on a same extension line.

In one embodiment of the backlight source, the data traces, the plurality of light control traces, the signal input traces, and the signal output traces are not cross to each other.

In one embodiment of the backlight source, the circuit layer further includes power traces and power pads connected to the power traces, the power pads are disposed between the plurality of light control pads, and the power traces, the plurality of light control traces, the signal input traces, and the signal output traces are all disposed at the same layer.

In one embodiment of the backlight source, the power traces, the plurality of light control traces, the signal input traces, and the signal output traces are not cross to each other.

In one embodiment of the backlight source, the circuit layer further includes ground traces and ground pads connected to the ground traces, the backlight source is further defined with a plurality of divisions, each of the divisions is quadrilateral like and including 4 of the light control pads, the 4 light control pads define a pad region with a quadrilateral like shape, and the ground pads, the signal input pads, and the signal output pads are disposed in the pad region.

In one embodiment of the backlight source, the plurality of divisions are arranged in a plurality of columns, the circuit layer further includes auxiliary ground traces, and ends of the ground traces of a last division in each column of the divisions are connected to the auxiliary ground trace.

In one embodiment of the backlight source, the plurality of divisions are arranged in a plurality of columns, the signal output trace of a last division in a first column of the divisions connected to the signal input trace of a last division in a second column of the divisions.

In one embodiment of the backlight source, the plurality of divisions are arranged in a plurality of columns, the signal output trace of a previous division is connected to the signal input trace of a next division in each column of the divisions.

In one embodiment of the backlight source, the circuit layer further includes a plurality of high level traces, each light level trace is disposed between adjacent light emitting units and connected to another end of the light emitting unit.

In one embodiment of the backlight source, the light emitting units include a plurality of mini light emitting diodes.

Another embodiment of the disclosure further provides a display device, including a backlight source and liquid crystal display (LCD) panel disposed on the backlight source, wherein the backlight source includes:
- a substrate;
- a circuit layer disposed on the substrate;
- a plurality of light emitting units disposed on the circuit layer; and
- a plurality of driving chips disposed on the circuit layer, disposed between adjacent light emitting units, and configured to drive the plurality of light emitting units to emit light, wherein the circuit layer includes signal input traces, signal output traces, and a plurality of light control trace disposed at a same layer and further includes signal input pads, signal output pads, and a plurality of light control pads correspondingly, the signal input traces are connected to the signal input pads, the signal output traces are connected to the signal output pads, the light control traces are connected to the light control pads, the signal input pads, the signal output pads, and the light control pads are connected to the driving chips, the plurality of light control pads are disposed at a plurality of ends of the driving chips near the light emitting units, the signal input traces and the signal output traces are disposed between the light control pads and configured to transmit signal to the driving chips.

In one embodiment of the display device, the backlight source further includes backlight control unit connected to the driving chips to provide luminance data.

In one embodiment of the display device, the LCD panel includes LCD control unit connected to the LCD panel to control the LCD panel to display.

In one embodiment of the disclosure, the display device further including image signal source, wherein the backlight control unit and the LCD control unit are both connected to the image signal source, the LCD control unit is configured to control the LCD display to display image data provided from the image signal source, and the backlight control unit is configured to dim locally according to the image data provided from the image signal source.

In comparison with prior art, the disclosure provides the backlight source and the display device include the circuit layer including the signal input traces, the signal output traces, the plurality of light control traces disposed at the same layer and including the signal input pads, the signal output pads, and the plurality of light control pads. the plurality of light control pads are disposed at a plurality of ends of the driving chips near the light emitting units, the signal input traces and the signal output traces are disposed between the light control pads and configured to transmit signal to the driving chips. It only needs to change the design of pins of existing driver chip on the market, without redesigning the driver chip itself, to meet the requirements of single-layer metal wiring, the cost is low, and there is no short circuit between different metal layers.

DETAILED DESCRIPTION

Figure 1:
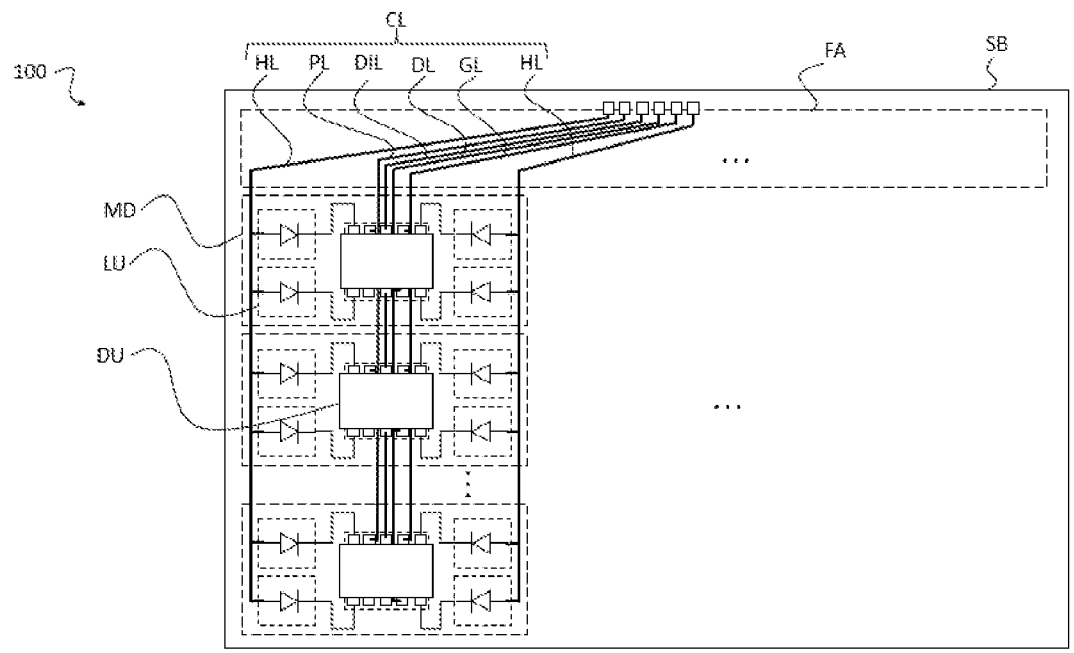
FIG. 1 is a schematic view of a structure of a backlight source of an embodiment of the present disclosure.
Figure 2:
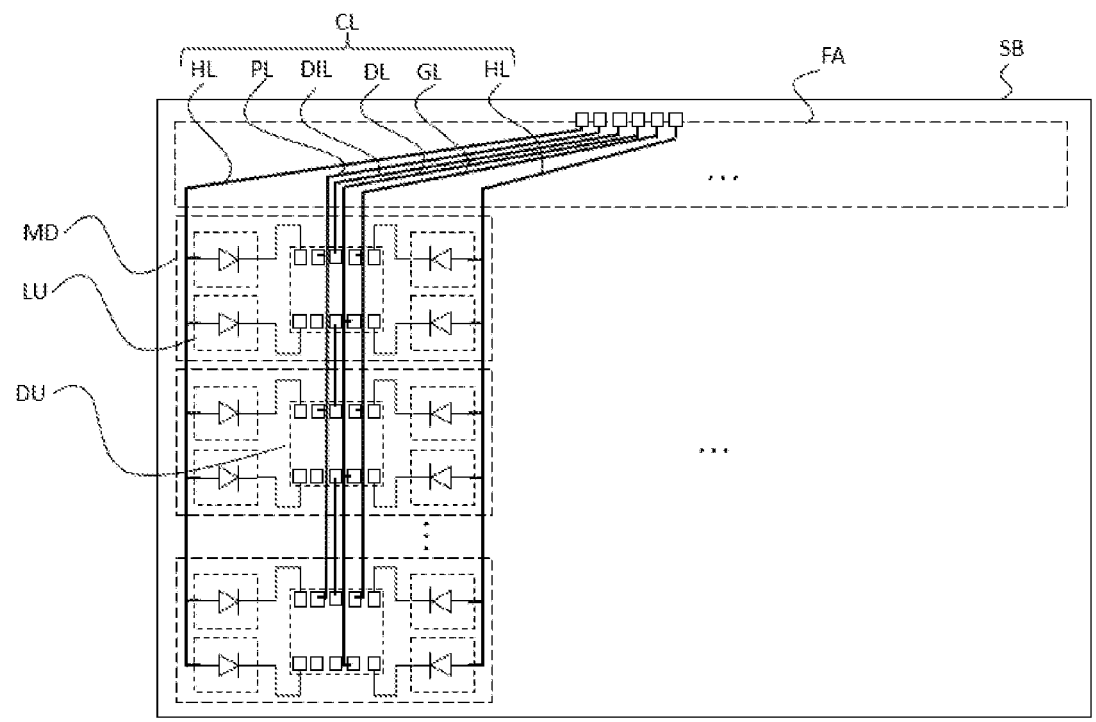
FIG. 2 is a schematic view of a structure of a substrate and a circuit layer of an embodiment of the present disclosure.

The specific structure and functional details disclosed herein are only representative and are used for the purpose of describing exemplary embodiments of the present application. However, this application can be implemented in many alternative forms, and should not be interpreted as being limited only to the embodiments set forth herein.

In the description of this application, it should be understood that the terms "center", "lateral", "upper", "lower", "left", "right", "vertical", "horizontal", "top", The orientation or positional relationship indicated by "bottom", "inner", "outer", etc. is based on the orientation or positional relationship shown in the drawings, and is only for the convenience of describing the application and simplifying the description, and does not indicate or imply the pointed device Or the element must have a specific orientation, be constructed and operated in a specific orientation, and therefore cannot be understood as a limitation of the present application. In addition, the terms "first" and "second" are only used for descriptive purposes and cannot be understood as indicating or implying relative importance or implicitly indicating the number of indicated technical features. Therefore, the features defined with "first" and "second" may explicitly or implicitly include one or more of these features. In the description of this application, unless otherwise specified, "plurality" means two or more. In addition, the term "including" and any variations thereof is intended to cover non-exclusive inclusion.

In the description of this application, it should be noted that the terms "installation", "connection", and "connection" should be understood in a broad sense unless otherwise clearly specified and limited. For example, it can be a support connection or a detachable connection. Connected or integrally connected; it can be a mechanical connection or an electrical connection; it can be directly connected or indirectly connected through an intermediate medium, and it can be the internal communication between two components. For those of ordinary skill in the art, the specific meanings of the above-mentioned terms in this application can be understood under specific circumstances.

The terminology used here is only for describing specific embodiments and is not intended to limit the exemplary embodiments. Unless the context clearly dictates otherwise, the singular forms "a" and "one" used herein are also intended to include the plural. It should also be understood that the terms "including" and/or "comprising" used herein specify the existence of the stated features, integers, steps, operations, units and/or components, and do not exclude the existence or addition of one or more other features, integers, steps, operations, units, components, and/or combinations thereof.

The application will be further described below in conjunction with the drawings and embodiments.

Referring to FIG. 1, FIG. 2, FIG. 3, and FIG. 4, FIG. 2 and FIG. 4 do not show a driving chip DU for clear showing traces under the driving chip DU. One embodiment of the disclosure provides a backlight source 100 including: a substrate SB, a circuit layer CL, a plurality of light emitting units LU, and driving chips DU. The circuit layer CL is disposed on the substrate SB. The plurality of light emitting unit LU is disposed on the circuit layer CL in an array. The driving chips DU is disposed on the circuit layer CL, including a plurality of pins PN, disposed between adjacent light emitting units LU, and configured to drive the plurality of light emitting units LU to emit light. The circuit layer CL includes signal input traces DIL, signal output traces DOL, and a plurality of light control trace OL disposed at a same layer and further includes signal input pads DIP, signal output pads DOP, and a plurality of light control pads OP correspondingly. The signal input traces DIL are connected to the signal input pads DIP. The signal output traces DOL are connected to the signal output pads DOP. The light control traces OL are connected to the light control pads OP. The signal input pads DIP, the signal output pads DOP, and the light control pads OP are connected to the driving chips DU. The plurality of light control pads OP are disposed at a plurality of ends of the driving chips DU near the light emitting units LU. The signal input traces DIL and the signal output traces DOL are disposed between the light control pads OP and configured to transmit signal to the driving chips DU.

In detail, the plurality of light control traces OL, ground traces GL, the signal input traces DIL, and the signal output traces DOL are disposed in the same layer. For example, a layer of metal copper film disposed on the substrate SB is subjected to an exposure and development process to form a pattern of the plurality of light control traces OL, the ground traces GL, the signal input traces DIL, and the signal output traces DOL. It can meet the requirements of single-layer metal wiring, with low cost and no yield problems such as short-circuiting between different metal layers.

In one embodiment of the backlight source, the circuit layer CL further includes a plurality of high level traces HL, each light level trace HL is disposed between adjacent light emitting units LU and connected to another end of the light emitting unit LU.

In detail, please refer to FIG. 1a, FIG. 2, FIG. 3, and FIG. 4. The ground pad GP, the signal input pad DIP, and the signal output pad DOP are all disposed between the plurality of light control pads OP. The plurality of light control pads OP are located at the outermost side of the pad region PA. Therefore, traces for the driving chip DU disposed between the plurality of light emitting units LU, for example, the ground trace GL, the signal input trace DIL, and the signal output trace DOL, etc. can run between two adjacent columns of light emitting units LU and directly pulled from the fanout area FA to an edge of the substrate SB. They will not intersect with the light control traces OL or the high level traces HL required by the light-emitting unit LU. It can meet the requirements of single-layer metal traces, with low cost, and no yield problems such as short-circuiting between different metal layers.

In detail, the backlight source 100 takes a semiconductor component as the light emitting unit LU. In the backlight source of some embodiments of the present application, the light emitting unit LU is a mini light emitting diode (mini-LED). In other embodiments, the light emitting unit LU is a light emitting diode (LED), an organic light emitting diode (OLED), or a micro light emitting diode (micro-LED), etc. This application does not limit to this. The quantity of the light emitting components such as mini-LED or micro-LED in the light emitting unit LU is at least one, and it can also be two lights, four lights, six lights, eight lights, ten lights, twelve lights, fourteen lights, and sixteen lights. Multiple light emitting components can be connected in series or connected in series and then connected in parallel to form multiple columns of light emitting components. The present application is not limited to this. The distance between each light is also not limited.

In detail, the material of the substrate SB includes glass, printed circuit board (PCB) or bismaleimide triazine (BT) resin board.

Figure 5:
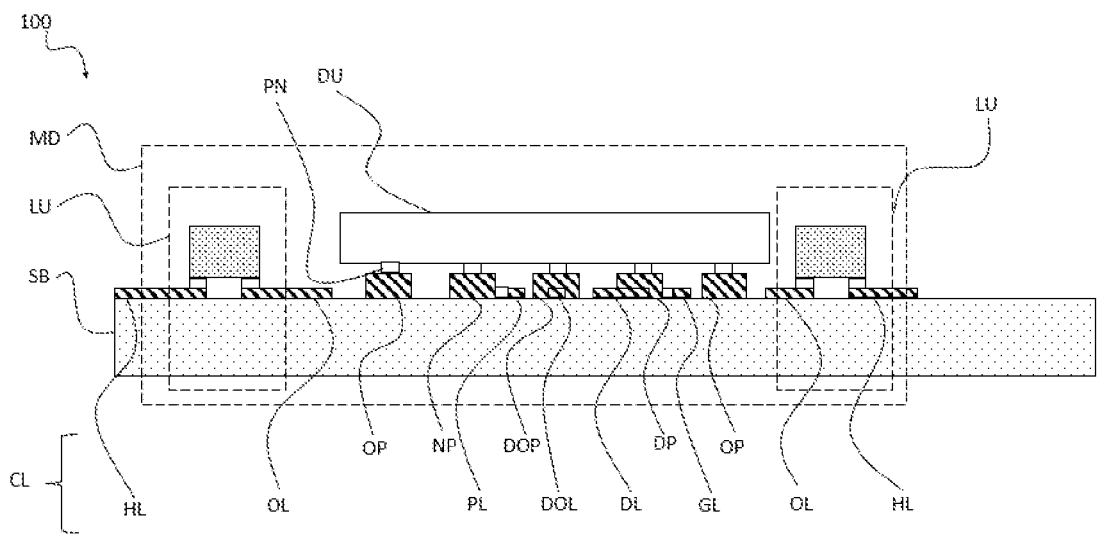
FIG. 5 is a schematic cross-sectional view of a structure of FIG. 3 along line AA.

In detail, referring to FIG. 5, the circuit layer CL is disposed on the substrate SB. The light emitting unit LU and the driving chip DU are arranged on the circuit layer CL. The driving chip DU has a ball grid array (BGA) package, a lead frame package, a surface mounted device (SMD) package or other packages. The drawings in this application all take the ball grid array package as an example, but the application is not limited to this. In detail, the multiple pins PN of the driving chip DU refer to pins in a lead frame package or solder balls in a ball grid array package. In detail, a package size of the driving chip DU is less than 1500 μm×1500 μm.

In detail, the signal input traces DIL is configured to provide brightness data for each light emitting unit LU and corresponding address data of the light emitting unit LU to the driving chip DU. The data is transmitted from the signal output line DOL to the driving chip DU of the next division MD in a cascading manner.

Referring to FIG. 1, FIG. 2, FIG. 3, and FIG. 4. In one embodiment of the backlight source 100, the circuit layer CL further includes data traces DL and data pads DP connected to the data traces DL.

The data traces DL are used to provide pulse-width modulation (PWM), signal, address data, or scan signal to the driving chip DU, depending on the design of the driving chip DU, and the application is not limited thereto. The data pads DP are disposed between the plurality of light control pads OP. The data traces DL, the plurality of light control traces OL, the signal input traces DIL, and the signal output traces DOL are all disposed at the same layer. One of the pins PN of the driving chip DU contacts the data pad DP. One of the signal input traces DIL and one of the signal output traces DOL are disposed on a same extension line.

In detail, another data structure of the signal input traces DIL, the signal output traces DOL, and the data traces DL is a daisy chain structure, and the address passes through the signal input traces DIL, the signal output traces DOL. The brightness/luminance data is simultaneously transmitted to all the driving chips DU through the data traces DL, and the application is not limited to this.

In one embodiment of the backlight source 100, the data traces DL, the plurality of light control traces OL, the signal input traces DIL, and the signal output traces DOL are not cross to each other. In detail, the data traces DL, the plurality of light control traces OL, the signal input traces DIL, and the signal output traces DOL are configured to transmit different signals and are insulating from each other. The data traces DL, the plurality of light control traces OL, the signal input traces DIL, and the signal output traces DOL are disposed in a same metal layer and not cross to each other.

In one embodiment of the backlight source 100, the circuit layer CL further includes power traces PL and power pads PP connected to the power traces PL.

In detail, the power trace PL is configured to provide a power for operation of the driving chip DU. The power pads PP are disposed between the plurality of light control pads OP, and the power traces PL, the plurality of light control traces OL, the signal input traces DIL, and the signal output traces DOL are all disposed at the same layer. One of the pins PN of the driving chip DU contacts the power pad PP.

In one embodiment of the backlight source 100, the power traces PL, the plurality of light control traces OL, the signal input traces DIL, and the signal output traces DOL are not cross to each other.

In one embodiment of the backlight source 100, the circuit layer CL further includes ground traces GL and ground pads GP connected to the ground traces GL. The backlight source is further defined with a plurality of divisions MD.

This application does not limit the shape of the division MD, and the quantity and distribution position of the plurality of light emitting units LU in each division MD. In one embodiment of the backlight source 100, each of the divisions MD is quadrilateral like, includes 4 of the light emitting units LU distributed at four corners of the division MD. Each division MD includes 4 of the light control pads OP. The 4 light control pads OP define a pad region PA with a quadrilateral like shape. The ground pads GP, the signal input pads DIP, and the signal output pads DOP are disposed in the pad region PA.

Figure 3:
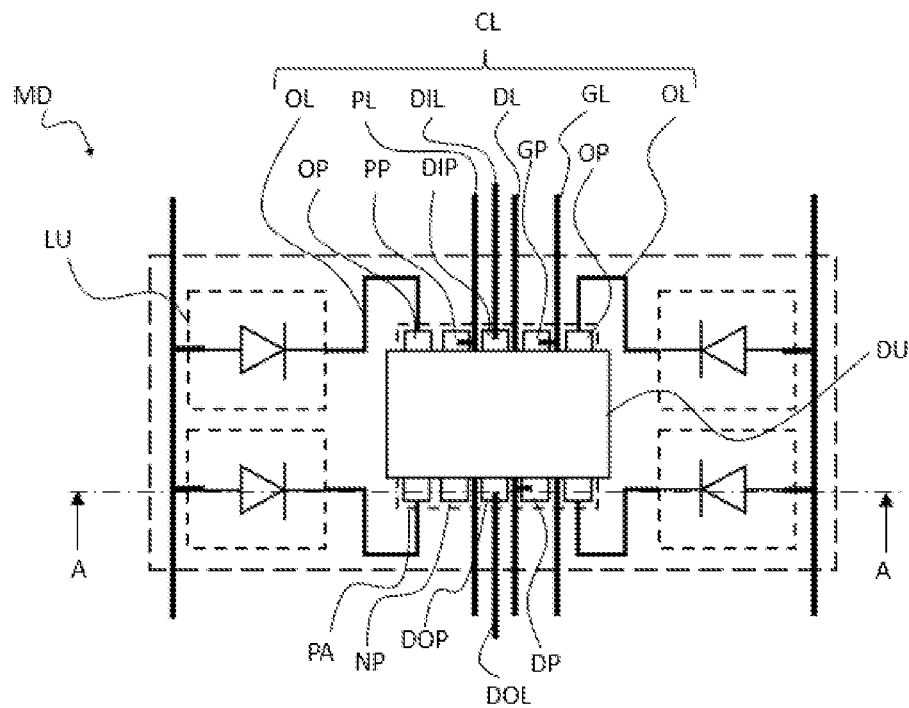
FIG. 3 is a schematic view of a structure of a division of an embodiment of the present disclosure.
Figure 4:
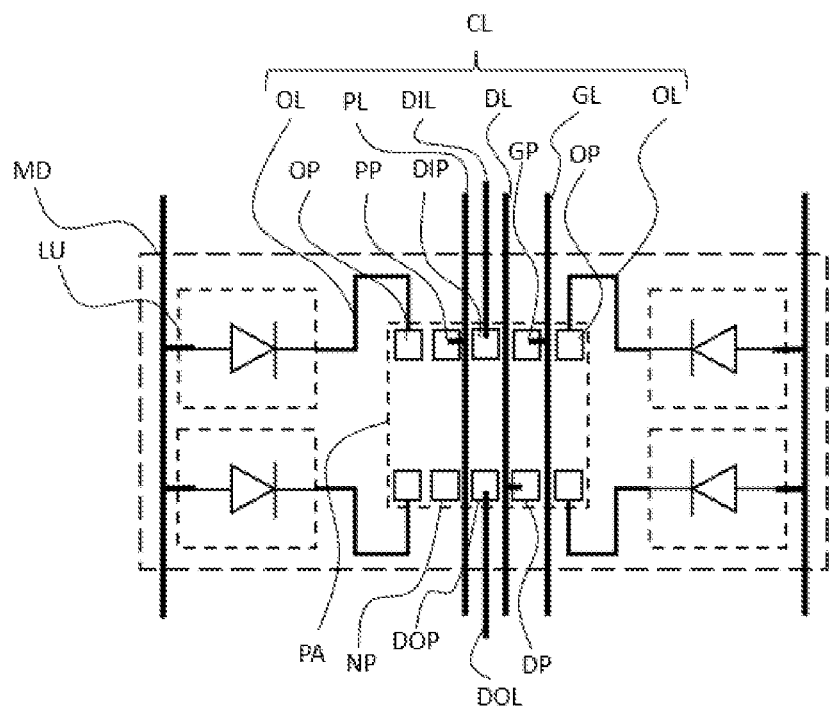
FIG. 4 is a schematic view of a structure of a circuit layer of a division of an embodiment of the present disclosure.

In detail, please refer to FIG. 3 and FIG. 4. In the pad region PA of the embodiment of the present application, 10 pads are arranged in two rows, a 2 rows×5 columns arrangement. Four corners of the pad region PA are arranged with four light control pads OP. The signal input pad DIP, the signal output pad DOP are arranged in a same row. Positions of other pads such as the power pads PP, the ground pads GP, the null pads NP, and the data pads DP can be replaced with each other. The corresponding wiring design needs to be replaced simultaneously when the pads are replacing each other. In detail, in the pad region PA of this embodiment, the light control pad OP, the power pad PP, the signal input pad DIP, the ground pad GP, and another light control pad OP are sequentially arranged from left to right on the upper row. The next row from left to right is: light control pad OP, null pad NP, signal output pad DOP, data pad DP, and another light control pad OP. Among them, the power pad PP, the signal input pad DIP, the ground pad GP, the null pad NP, the signal output pad DOP, and the data pad DP are all arranged between the four light control pads OP, so that traces to the power pad PP, signal input pad DIP, ground pad GP, null pad NP, signal output pad DOP, and data pad DP can be centrally arranged between adjacent light emitting units LU and directly pulled out from the fanout area FA to the edge of the substrate SB without intersect with the light control traces OL or the high level traces HL required by the light emitting units LU. It can meet the requirements of single-layer metal traces, has low cost, and no yield problems such as shorting between different metal layers.

In detail, this application does not limit the package pins of the driving chip DU, the naming of the pins, and the functions of the pins. In detail, the shape of each pad, such as a circle, a square, a rectangle, etc., is not limited in this application.

Figure 6:
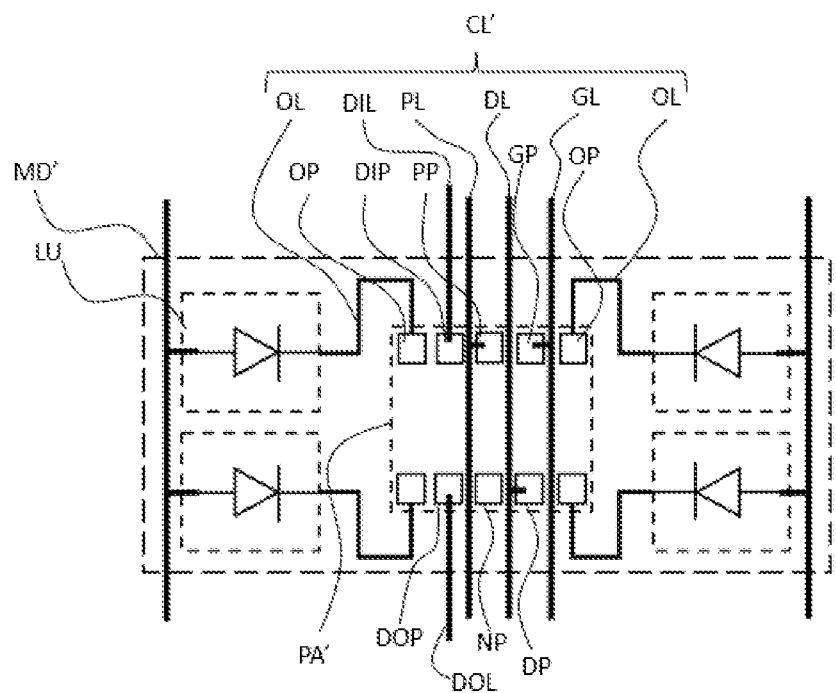
FIG. 6 is a schematic view of a structure of a circuit layer of a division of another embodiment of the present disclosure.

In detail, please refer to FIG. 6, in the pad region PA' of the division MD' of another embodiment of the present application, a plurality of pads are arranged in two rows, and the light control pad OP, the signal input pad DIP, the power pad PP, the ground pad GP and another light control pad OP are arranged in order from left to right on the upper row. The next row from left to right is: the light control pad OP, the signal output pad DOP, the null pad NP, the data pad DP, and another light control pad OP. The arrangement of these pads cooperated with corresponding light control traces OL, power traces PL, ground traces GL, signal input traces DIL, signal output traces DOL, and data traces DL form different circuit layers CL'. The circuit of the driving chip DU' does not need to be redesigned. Only the pin position of the package needs to be changed accordingly. Among them, the power pad PP, the signal input pad DIP, the ground pad GP, the null pad NP, the signal output pad DOP, and the data pad DP of the circuit layer CL' are all arranged between the four light control pads OP. So that the traces connecting to the power pad PP, the signal input pad DIP, the ground pad GP, the null pad NP, the signal output pad DOP, and the data pad DP can be centrally arranged between the adjacent light emitting units LU, These traces are drawn directly from the fanout area FA to the edge of the substrate SB without intersect with the light control traces OL or the high level traces HL required by the light emitting unit LU. It can meet the requirements of single-layer metal trace at a low cost, and no yield problems such as shorting between different metal layers.

Figure 7:
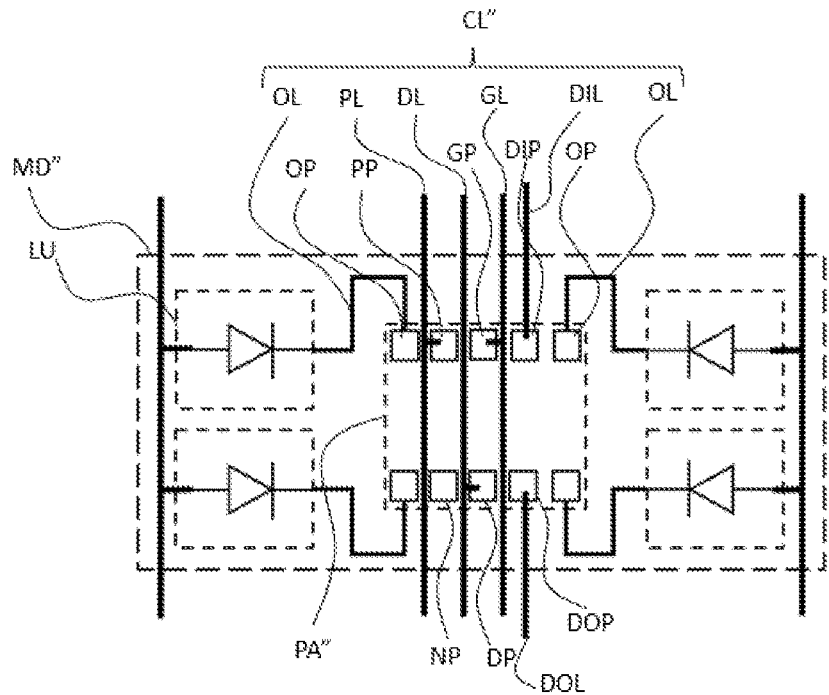
FIG. 7 is a schematic view of a structure of a circuit layer of a division of further another embodiment of the present disclosure.

In detail, please refer to FIG. 7. In the pad region PA" of the division MD" of another embodiment of the present application, a plurality of pads are arranged in two rows, and the light control pad OP, the power pad PP, the ground pad GP, the signal input pad DIP and another light control pad OP are arranged in order from left to right on the upper row. The next row from left to right is: the light control pad OP, the null pad NP, the data pad DP, the signal output pad DOP, and another light control pad OP. The arrangement of these pads cooperated with corresponding light control traces OL, power traces PL, ground traces GL, signal input traces DIL, signal output traces DOL, and data traces DL form different circuit layers CL". The circuit of the driver chip DU" itself does not need to be redesigned, only the pin position of the package needs to be changed accordingly. Among them, the power pad PP, the signal input pad DIP, the ground pad GP, the null pad NP, the signal output pad DOP, and the data pad DP of the circuit layer CL" are all arranged between the four light control pads OP. So that the traces connecting to the power pad PP, the signal input pad DIP, the ground pad GP, the null pad NP, the signal output pad DOP, and the data pad DP can be centrally arranged between the adjacent light emitting units LU. These traces are drawn directly from the fanout area FA to the edge of the substrate SB without intersect with the light control traces OL or the high level traces HL required by the light emitting unit LU, which can meet the requirements of single-layer metal trace at a low cost, and no yield problems such as shorting between different metal layers.

Figure 8:
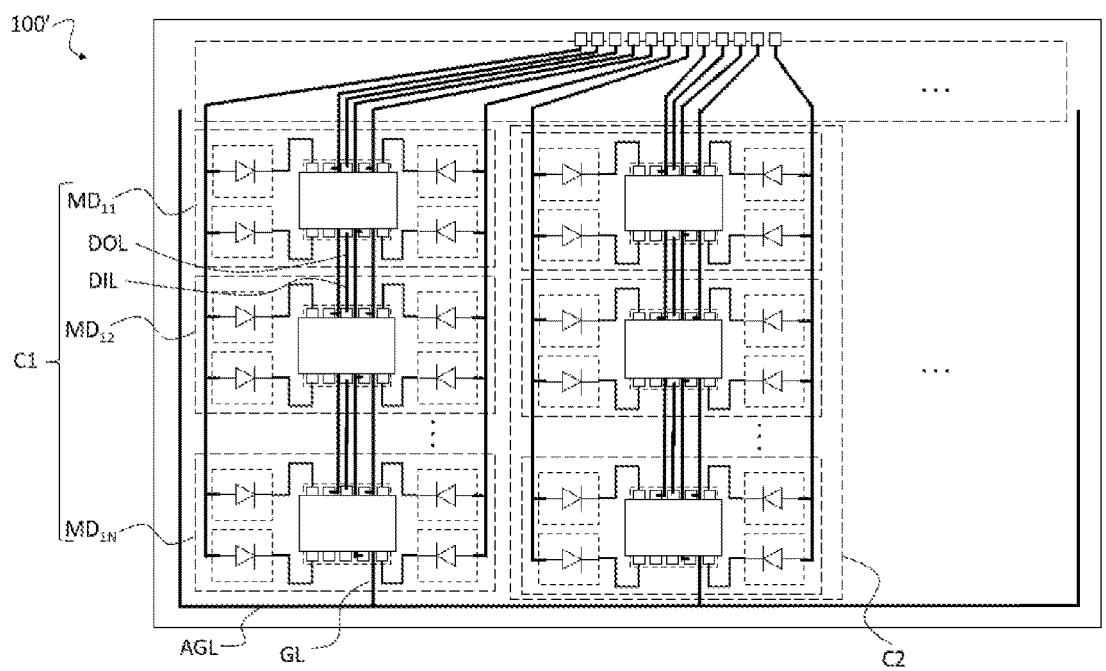
FIG. 8 is a schematic view of a structure of a backlight source of another embodiment of the present disclosure.

Referring to FIG. 8, in one embodiment of the backlight source 100', the plurality of divisions $MD_{11}$, $MD_{12}$ . . . are arranged in a plurality of columns C1, C2 . . . , and the circuit layer CL further includes auxiliary ground traces AGL. Ends of the ground traces GL of a last division (such as $MD_{1N}$) in each column of the divisions (such as C1) are connected to the auxiliary ground trace AGL.

In detail, when a tighter arrangement of the light emitting units LU results in insufficient wiring space between the light emitting units LU, the width of the ground traces GL can be reduced to give way to other traces, and an auxiliary ground trace AGL may be used in addition. The auxiliary ground trace AGL is designed to improve the voltage drop or voltage instability caused by the insufficient width of the ground trace GL. The auxiliary ground trace AGL includes a horizontal section and two vertical sections. The vertical section is parallel to an extension direction of each column of the divisions (such as C1) and is located at the extreme edge of the substrate SB to provide a voltage stabilization and shielding effect.

Figure 9:
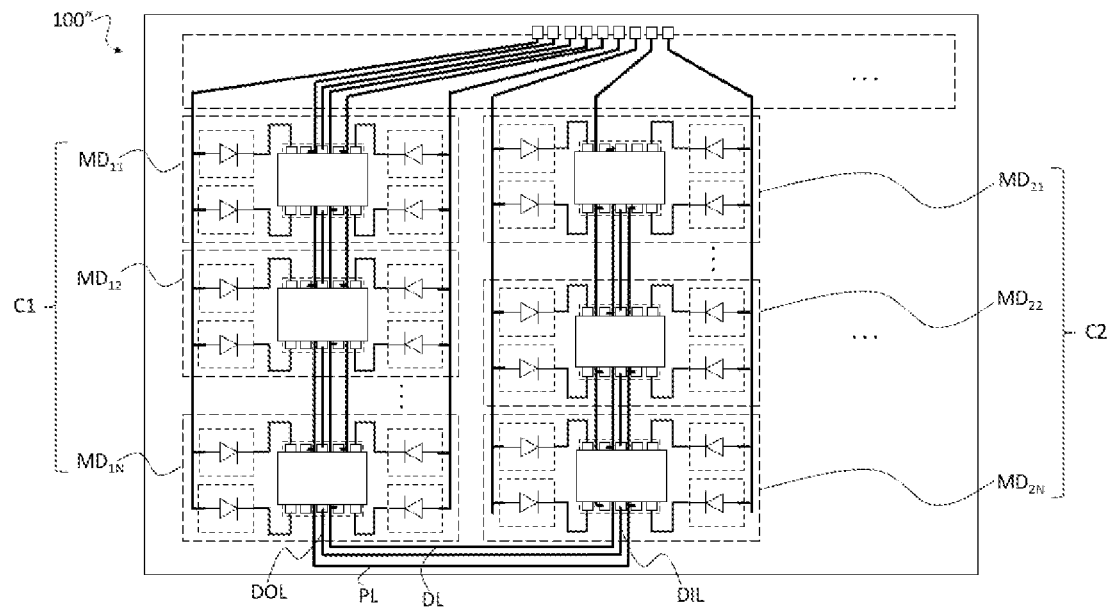
FIG. 9 is a schematic view of a structure of a backlight source in still another embodiment of the present disclosure.

Referring to FIG. 9, in one embodiment of the backlight source 100", the plurality of divisions $MD_{11}$, $MD_{12}$ . . . are arranged in a plurality of columns C1, C2 . . . , the signal output trace DOL of a last division $MD_{1N}$ in a first column C1 of the divisions connected to the signal input trace DIL of a last division $MD_{2N}$ in a second column C2 of the divisions. In the embodiment, because the signal output trace DOL of a last division $MD_{1N}$ in a first column C1 of the divisions connected to the signal input trace DIL of a last division $MD_{2N}$ in a second column C2 of the divisions, that is, a brightness/luminance data acquired by the driving chip DU in the last division $MD_{2N}$ in the second column C2 of the divisions come from the signal output trace DOL of the last division $MD_{IN}$ of the first column C1 of the divisions, compared with the embodiment of FIG. 8, the second column C2 of the divisions of this embodiment does not need to provide signal input trace DIL in the fanout area FA, which can reduce the number of traces in the fanout area FA, save space of the fanout area FA, and reduce the design complexity of the fanout area FA.

Referring to FIG. 9, in one embodiment of the backlight source 100″, the power trace PL of a last division $MD_{1N}$ in a first column C1 of the divisions connected to the power trace PL of a last division $MD_{2N}$ in a second column C2 of the divisions. In the embodiment, an operation power acquired by the driving chip DU in the last division $MD_{2N}$ in the second column C2 of the divisions come from the power trace PL of the last division $MD_{1N}$ of the first column C1 of the divisions. Compared with the embodiment of FIG. 8, the second column C2 of the divisions of this embodiment does not need to provide power trace PL in the fanout area FA, which can reduce the number of traces in the fanout area FA, save space of the fanout area FA, and reduce the design complexity of the fanout area FA.

Referring to FIG. 9, in one embodiment of the backlight source 100″, the data trace DL of a last division $MD_{1N}$ in a first column C1 of the divisions connected to the data trace DL of a last division $MD_{2N}$ in a second column C2 of the divisions. In the embodiment, signal acquired by the driving chip DU in the last division $MD_{2N}$ in the second column C2 of the divisions come from the data trace DL of the last division $MD_{1N}$ of the first column C1 of the divisions. Compared with the embodiment of FIG. 8, the second column C2 of the divisions of this embodiment does not need to provide data trace DL in the fanout area FA, which can reduce the number of traces in the fanout area FA, save space of the fanout area FA, and reduce the design complexity of the fanout area FA.

Referring to FIG. 8, in one embodiment of the backlight source (such as 100′), the plurality of divisions $MD_{11}$, $MD_{12}$ . . . are arranged in a plurality of columns C1, C2 . . . , the signal output trace DOL of a previous division (such $MD_{11}$) is connected to the signal input trace DIL of a next division (such as $MD_{12}$) in each column (such as C1) of the divisions.

Figure 10:
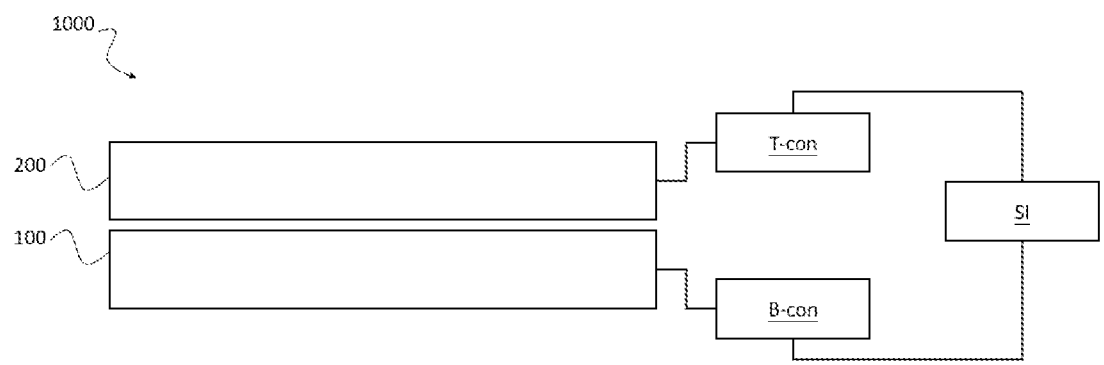
FIG. 10 is a schematic view of a structure of a display device of an embodiment of the present disclosure.

Referring to FIG. 10, another embodiment of the disclosure further provides a display device 1000, including the abovementioned backlight source (such as backlight source 100) and liquid crystal display (LCD) panel 200 disposed on the backlight source 100. The backlight source 100 is configured to provide backlight required by the LCD panel 200. In detail, the backlight source 100 further includes: backlight control unit B-con connected to the driving chips to provide brightness/luminance data, address data, PWM data, or scanning data. The LCD panel 200 includes LCD control unit T-con connected to the LCD panel 200 to control the LCD panel 200 to display. The backlight control unit B-con and the LCD control unit T-con are both connected to an image signal source IS. The LCD control unit T-con is configured to display image data provided from the image signal source IS, and the backlight control unit B-con is configured to dim locally according to the image data provided from the image signal source IS.

In comparison with prior art, the disclosure provides the backlight source and the display device include the circuit layer including the signal input traces, the signal output traces, the plurality of light control traces disposed at the same layer and including the signal input pads, the signal output pads, and the plurality of light control pads. the plurality of light control pads are disposed at a plurality of ends of the driving chips near the light emitting units, the signal input traces and the signal output traces are disposed between the light control pads and configured to transmit signal to the driving chips. It only needs to change the design of pins of existing driver chip on the market, without redesigning the driver chip itself, to meet the requirements of single-layer metal wiring, the cost is low, and there is no short circuit between different metal layers.

The backlight source and the display device provided by the embodiments of the present application are described in detail above.

The present disclosure of a display panel, a display device, and a method of manufacturing a display panel have been described by the above embodiments, but the embodiments are merely examples for implementing the present disclosure. It must be noted that the embodiments do not limit the scope of the invention. In contrast, modifications and equivalent arrangements are intended to be included within the scope of the invention.

What is claimed is:

1. A backlight source, comprising:
a substrate;
a circuit layer disposed on the substrate;
a plurality of light emitting units disposed on the circuit layer; and
a plurality of driving chips disposed on the circuit layer, disposed between adjacent ones of the light emitting units, and configured to drive the plurality of light emitting units to emit light, wherein the circuit layer comprises signal input traces, signal output traces, and a plurality of light control traces disposed at a same layer and further comprises signal input pads, signal output pads, and a plurality of light control pads correspondingly, the signal input traces are connected to the signal input pads, the signal output traces are connected to the signal output pads, the light control traces are connected to the light control pads, the signal input pads, the signal output pads, the light control pads are connected to the driving chips, and the plurality of light control pads are disposed at a plurality of ends of the driving chips near the light emitting units, and
wherein the backlight source further comprises a plurality of divisions, the plurality of divisions are arranged in a matrix of N rows and M columns, each of the divisions is quadrilateral like and comprises four of the light control pads, the four light control pads define a pad region with a quadrilateral like shape, and ground pads, the signal input pads, and the signal output pads are disposed in the pad region, wherein N is greater than one and M is greater than one,
the signal output trace of one of the divisions in a first one of the M columns and an N-th row of the N rows is connected to the signal input trace of one of the divisions in a second one of the columns and the N-th row of the N rows, so that a luminance data acquired by the driving chips in the one of the divisions in the second one of the columns and the N-th row of the N rows comes from the signal output trace of the one of the divisions in the first one of the M columns and the N-th row of the N rows and there is no need to provide additional signal input traces for the divisions in the second one of the columns in a fanout area of the backlight source,
the circuit layer further comprises power traces and power pads connected to the power traces, the power pads are disposed between the plurality of light control pads, and the power traces, the plurality of light control traces, the signal input traces, and the signal output traces are all disposed at the same layer, and the power trace of the one of the divisions in the first one of the M columns and the N-th row of the N rows is connected to the power trace of the one of the divisions in the second one of the columns and the N-th row of the N rows, so that an operation power acquired by the driving chips in the one of the divisions in the second one of the columns and the N-th row of the N rows comes from the power trace of the one of the divisions in the first one of the M columns and the N-th row of the N rows and there is no need to provide additional power traces for the divisions in the second one of the columns in the fanout area.

2. The backlight source according to claim 1, wherein the circuit layer further comprises data traces and data pads connected to the data traces, the data pads are disposed between the plurality of light control pads, the data traces, the plurality of light control traces, the signal input traces, and the signal output traces are all disposed at the same layer, and one of the signal input traces and one of the signal output traces are disposed on a same extension line.

3. The backlight source according to claim 2, wherein the data traces, the plurality of light control traces, the signal input traces, and the signal output traces are not cross to each other.

4. The backlight source according to claim 2, wherein the data trace of one of the divisions in a first one of the M columns and an N-th row of the N rows is connected to the data trace of one of the divisions in a second one of the columns and the N-th row of the N rows.

5. The backlight source according to claim 1, wherein the power traces, the plurality of light control traces, the signal input traces, and the signal output traces are not cross to each other.

6. The backlight source according to claim 1, wherein the circuit layer further comprises ground traces and the ground pads connected to the ground traces.

7. The backlight source according to claim 6, wherein the circuit layer further comprises auxiliary ground traces, and ends of the ground traces of a last division in each of the columns of the divisions are connected to the auxiliary ground trace.

8. The backlight source according to claim 6, wherein the signal output trace of a previous division is connected to the signal input trace of a next division in each of the columns of the divisions.

9. The backlight source according to claim 1, wherein the circuit layer further comprises a plurality of high level traces, each of the high level traces is disposed between adjacent ones of the light emitting units and connected to another end of the light emitting unit.

10. The backlight source according to claim 1, wherein the light emitting units comprise a plurality of mini light emitting diodes.

11. The backlight source according to claim 1, wherein in a plan view of the backlight source, each of the driving chips has a first side and a second side parallel to each other and opposite to each other, the signal input traces and the signal output traces extend between the driving chips in a first direction perpendicular to an extension direction of the first side, a first light control pad of the light control pads, one of the signal input pads, another first light control pad of the light control pads are arranged in this order at the first side along the extension direction of the first side, a second light control pad of the light control pads, one of the signal output pads, another second light control pad of the light control pads are arranged in this order at the second side along the extension direction of the first side, and the signal input traces and the signal output traces are not cross to each other at the driving chip.

12. A display device comprising a backlight source and a liquid crystal display (LCD) panel disposed on the backlight source, wherein the backlight source comprises:
a substrate;
a circuit layer disposed on the substrate;
a plurality of light emitting units disposed on the circuit layer; and
a plurality of driving chips disposed on the circuit layer, disposed between adjacent ones of the light emitting units, and configured to drive the plurality of light emitting units to emit light, wherein the circuit layer comprises signal input traces, signal output traces, and a plurality of light control traces disposed at a same layer and further comprises signal input pads, signal output pads, and a plurality of light control pads correspondingly, the signal input traces are connected to the signal input pads, the signal output traces are connected to the signal output pads, the light control traces are connected to the light control pads, the signal input pads, the signal output pads, the light control pads are connected to the driving chips, and the plurality of light control pads are disposed at a plurality of ends of the driving chips near the light emitting units, and
wherein the backlight source further comprises a plurality of divisions, the plurality of divisions are arranged in a matrix of N rows and M columns, each of the divisions is quadrilateral like and comprises four of the light control pads, the four light control pads define a pad region with a quadrilateral like shape, and the ground pads, the signal input pads, and the signal output pads are disposed in the pad region, wherein N is greater than one and M is greater than one,
the signal output trace of one of the divisions in a first one of the M columns and an N-th row of the N rows is connected to the signal input trace of one of the divisions in a second one of the columns and the N-th row of the N rows, so that a luminance data acquired by the driving chips in the one of the divisions in the second one of the columns and the N-th row of the N rows comes from the signal output trace of the one of the divisions in the first one of the M columns and the N-th row of the N rows and there is no need to provide additional signal input traces for the divisions in the second one of the columns in a fanout area of the backlight source,
the circuit layer further comprises power traces and power pads connected to the power traces, the power pads are disposed between the plurality of light control pads, and the power traces, the plurality of light control traces, the signal input traces, and the signal output traces are all disposed at the same layer, and
the power trace of the one of the divisions in the first one of the M columns and the N-th row of the N rows is connected to the power trace of the one of the divisions in the second one of the columns and the N-th row of the N rows, so that an operation power acquired by the driving chips in the one of the divisions in the second one of the columns and the N-th row of the N rows comes from the power trace of the one of the divisions in the first one of the M columns and the N-th row of the N rows and there is no need to provide additional power traces for the divisions in the second one of the columns in the fanout area.

13. The display device according to claim 12, wherein the backlight source further comprises a backlight control unit connected to the driving chips to provide luminance data.

14. The display device according to claim 13, wherein the LCD panel comprises an LCD control unit connected to the LCD panel to control the LCD panel to display.

15. The display device according to claim 14, further comprising an image signal source, wherein the backlight control unit and the LCD control unit are both connected to the image signal source, the LCD control unit is configured to control the LCD display to display image data provided from the image signal source, and the backlight control unit is configured to dim locally according to the image data provided from the image signal source.

16. The display device according to claim 12, wherein in a plan view of the backlight source, each of the driving chips has a first side and a second side parallel to each other and opposite to each other, the signal input traces and the signal output traces extend between the driving chips in a first direction perpendicular to an extension direction of the first side, a first light control pad of the light control pads, one of the signal input pads, another first light control pad of the light control pads are arranged in this order at the first side along the extension direction of the first side, a second light control pad of the light control pads, one of the signal output pads, another second light control pad of the light control pads are arranged in this order at the second side along the extension direction of the first side, and the signal input traces and the signal output traces are not cross to each other at the driving chip.

17. The display device according to claim 12, wherein the circuit layer further comprises data traces and data pads connected to the data traces, the data pads are disposed between the plurality of light control pads, and the data trace of one of the divisions in a first one of the M columns and an N-th row of the N rows is connected to the data trace of one of the divisions in a second one of the columns and the N-th row of the N rows.

\* \* \* \* \*